(12) United States Patent
Liang et al.

(10) Patent No.: US 11,709,309 B2
(45) Date of Patent: Jul. 25, 2023

(54) EDGE-LIT LIGHT SOURCE, BACKLIGHT MODULE AND DISPLAY DEVICES

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Fei Liang, Beijing (CN); Xiuyun Chen, Beijing (CN); Lingyu Sun, Beijing (CN); Jingjun Du, Beijing (CN); Peng Zhong, Beijing (CN); Tingxiu Hou, Beijing (CN); Jian Zhao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/792,445

(22) PCT Filed: Jul. 5, 2021

(86) PCT No.: PCT/CN2021/104521
§ 371 (c)(1),
(2) Date: Jul. 13, 2022

(87) PCT Pub. No.: WO2022/033234
PCT Pub. Date: Feb. 17, 2022

(65) Prior Publication Data
US 2023/0080052 A1    Mar. 16, 2023

(30) Foreign Application Priority Data
Aug. 13, 2020  (CN) .......................... 202010811924.5

(51) Int. Cl.
*F21V 8/00*    (2006.01)
(52) U.S. Cl.
CPC ......... *G02B 6/0076* (2013.01); *G02B 6/0028* (2013.01)
(58) Field of Classification Search
CPC ........................... G02B 6/0076; G02B 6/0028
See application file for complete search history.

(56) References Cited

U.S. PATENT DOCUMENTS 5,808,708 A    9/1998  Oyama et al.
9,566,751 B1   2/2017  Nichol et al.
(Continued)

FOREIGN PATENT DOCUMENTS

CN    101109869 A    1/2008
CN    203405654 U    1/2014
(Continued)

OTHER PUBLICATIONS

PCT International Search Report (w/ English Translation) and Written Opinion for corresponding PCT Application No. PCT/CN2021/104521, dated Sep. 23, 2021, 11 pages.
(Continued)

*Primary Examiner* — Donald L Raleigh
(74) *Attorney, Agent, or Firm* — Dority & Manning, P.A.

(57) ABSTRACT

An edge-lit light source includes one or at least two light guide layers arranged in a stack and one or more light-emitting elements. Of one or more light guide layers of the one or at least two light guide layers, side surfaces of each light guide layer includes a light incident surface and a light exit surface, and the light guide layer includes a bending region located between the light incident surface and the light exit surface. A light-emitting surface of each light-emitting element faces a light incident surface of at least one light guide layer of the one or more light guide layers.

19 Claims, 11 Drawing Sheets

(56) References Cited

U.S. PATENT DOCUMENTS

| | | | |
|---|---|---|---|
| 10,012,784 B1 | 7/2018 | Wooster et al. | |
| 2009/0290328 A1* | 11/2009 | Ueyama | G02B 6/0028 |
| | | | 362/97.3 |
| 2011/0273901 A1 | 11/2011 | Nichol et al. | |
| 2012/0287674 A1* | 11/2012 | Nichol | G02B 6/0018 |
| | | | 264/1.24 |
| 2013/0114293 A1 | 5/2013 | Morino et al. | |
| 2014/0126237 A1 | 5/2014 | Morino et al. | |
| 2017/0123129 A1 | 5/2017 | Zheng | |
| 2018/0284335 A1 | 10/2018 | Godbillon et al. | |
| 2019/0353959 A1 | 11/2019 | Wu | |

FOREIGN PATENT DOCUMENTS

| | | | | |
|---|---|---|---|---|
| CN | 104776363 A | 7/2015 | | |
| CN | 106569298 A | 4/2017 | | |
| CN | 207181740 U | 4/2018 | | |
| CN | 108614372 A | 10/2018 | | |
| CN | 109613754 A | 4/2019 | | |
| KR | 100939219 B1 | 1/2010 | | |
| WO | WO2018194973 A1 | 10/2018 | | |
| WO | WO-2020201251 A1 * | 10/2020 | | G02B 6/0076 |

OTHER PUBLICATIONS

Chinese First Office Action for corresponding Chinese Application No. 202010811924.5, dated Jun. 23, 2022, 18 pages.
Chinese Second Office Action for corresponding Chinese Application No. 202010811924.5, dated Nov. 29, 2022, 10 pages.

* cited by examiner

C-C'

EDGE-LIT LIGHT SOURCE, BACKLIGHT MODULE AND DISPLAY DEVICES

CROSS-REFERENCE TO RELATED APPLICATIONS

This application is a national phase entry under 35 USC 371 of International Patent Application No. PCT/CN2021/104521 filed on Jul. 5, 2021, which claims priority to Chinese Patent Application No. 202010811924.5 filed on Aug. 13, 2020, which are incorporated herein by reference in their entirety.

TECHNICAL HELD

The present disclosure relates to the field of display technologies, in particular, to an edge-lit light source, a backlight module and display devices.

BACKGROUND

Liquid crystal display (LCD) panels may be widely used in display devices such as notebook computers, personal digital assistants (PDAs), flat-screen televisions and mobile phones due to advantages of low radiation, small volume, low power consumption and the like.

SUMMARY

In an aspect, an edge-lit light source is provided. The edge-lit light source includes one or at least two light guide layers arranged in a stack, and at least one light-emitting element. Of one or more light guide layers of the one or at least two light guide layers, side surfaces of each light guide layer include a light incident surface and a light exit surface, and the light guide layer includes a bending region located between the light incident surface and the light exit surface. A light-emitting surface of each light-emitting element faces a light incident surface of at least one light guide layer of the one or more light guide layers.

In some embodiments, the light guide layer includes a first light guide portion and a second light guide portion connected to each other. An end surface of the first light guide portion away from the second light guide portion is the light exit surface. The second light guide portion includes at least two light guide bars, and each light guide bar includes a bending portion connected to the first light guide portion and an extending portion connected to the bending portion. A surface of the extending portion opposite to an end of the extending portion connected to the bending portion is a light incident sub-surface. The light-emitting surface of each light-emitting element faces at least one light incident sub-surface. The bending region of the light guide layer includes all of the bending portions of the light guide layer.

In some embodiments, the bending portions of the light guide layer are arranged in sequence in a first direction. The first direction is perpendicular to a thickness direction of the first light guide portion. The extending portions of the light guide layer extend in the first direction, and the extending portions are arranged in a stack.

In some embodiments, of the one or more light-emitting elements, at least one light-emitting element corresponding to the light guide layer is disposed on a side of the light guide layer in the first direction.

In some embodiments, of the one or more light-emitting elements, at least one light-emitting element corresponding to a same light guide layer is located on a same side of the same light guide layer in the first direction. Of the same light guide layer bending radiuses of bending portions sequentially increase in a direction from a side of a second light guide portion proximate to the corresponding light-emitting element to a side of the second light guide portion away from the corresponding light-emitting element.

In some embodiments, the extending portions of the light guide layer are located on at least one side of the first light guide portion in a thickness direction of the first light guide portion.

In some embodiments, the extending portions of the light guide layer are located on a same side of the first light guide portion in a thickness direction of the first light guide portion, and the light incident sub-surfaces of the extending portions constitute the light incident surface of the light guide layer. The light incident surface is located on a side of two opposite sides of the first light guide portion in the first direction, and the light incident surface faces a light-emitting surface of a single light-emitting element of the one or more light-emitting elements.

In some embodiments, the one or more light guide layers include at least two light guide layers, and second light guide portions of the at least two light guide layers are arranged in sequence in a second direction. The second direction is perpendicular to a thickness direction of the first light guide portion.

In some embodiments, the edge-lit light source further includes a light-guide-layer shaping member. The light-guide-layer shaping member has a first main surface and a second main surface opposite to each other, and a plurality of communication slots penetrating through the first main surface and the second main surface. Each bending portion of the light guide layer passes through a single communication slot of the plurality of communication slots, the extending portions of the light guide layer are proximate to the first main surface, and the first light guide portion of the light guide layer is proximate to the second main surface.

In some embodiments, a single side wall of the communication slot is arc-shaped. The bending portion passes through the communication slot and attaches to the arc-shaped side wall, and is configured to have a bending degree capable of keeping a total reflection state of light rays inside the bending portion.

In some embodiments, the edge-lit light source further includes a first reflective adhesive and/or a second reflective adhesive. The first reflective adhesive is disposed between the first main surface and an extending portion of the light guide layer closest to the first main surface. The second reflective adhesive is disposed between the second main surface and the first light guide portion.

In some embodiments, the light-guide-layer shaping member includes at least one first groove and a second groove and/or a third groove. The at least one first groove and the second groove are disposed in the first main surface, and the second groove is located on a side of the at least one first groove. The extending portions of the light guide layer are located in a first groove of the at least one first groove, and the one or more light-emitting elements are located in the second groove. The third groove is disposed in the second main surface, and at least a portion of the first light guide portion is located in the third groove.

In some embodiments, the edge-lit light source further includes a first cover body and/or a second cover body. The first cover body covers the at least one first groove and the second groove. The second cover body covers the third groove.

In some embodiments, the first cover body and the second light guide portion of the light guide layer have a gap therebetween; and/or the second cover body and the first light guide portion of the light guide layer have a gap therebetween.

In some embodiments, the first light guide portion includes a first portion and a second portion. The first portion has the light exit surface. The second portion is located between the first portion and the second light guide portion and in a bent shape. The bending region of the light guide layer further includes the second portion of the first light guide portion of the light guide layer.

In some embodiments, the first light guide portion further includes a third portion located between the second portion and the second light guide portion. The third portion and the first portion are substantially parallel to each other, and the third portion and the first portion are located on a same side of the second portion proximate to the second light guide portion.

In some embodiments, the edge-lit light source further includes a laminating adhesive disposed between two adjacent light guide layers of the one or more light guide layers. A refractive index of the laminating adhesive is substantially same as a refractive index of the two adjacent light guide layers; or the laminating adhesive is a reflective adhesive.

In some embodiments, the edge-lit light source further includes a reflective coating disposed on an exposed surface of the bending region.

In some embodiments, the edge-lit light source further includes a light-absorbing coating disposed on a surface of the reflective coating away from the exposed surface.

In another aspect, a backlight module is provided. The backlight module includes a light guide plate, and the edge-lit light source as described in any one of the above embodiments. A light exit surface of the edge-lit light source is matched with at least a portion of a side surface of the light guide plate, and the light exit surface of the edge-lit light source faces the at least a portion of the side surface of the light guide plate. The light exit surface of the edge-lit light source includes the light exit surface of the light guide layer.

In yet another aspect, a display device is provided. The display device includes a display panel and the backlight module as described in any one of the above embodiments. Two opposite sides of the display panel are a display side and a non-display side respectively. The backlight module is disposed on the non-display side of the display panel. Or the light guide plate in the backlight module is disposed on the display side of the display panel, and the edge-lit light source in the backlight module extends to the non-display side of the display panel.

In yet another aspect, a display device is provided. The display device includes a display panel and the edge-lit light source as described in any one of the above embodiments. A light exit surface of the edge-lit light source matched with at least a portion of a side surface of the display panel, and the light exit surface of the edge-lit light source faces the at least a portion of the side surface of the display panel. The light exit surface of the edge-lit light source includes the light exit surface of the light guide layer.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person having ordinary skill in the art may obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

DETAILED DESCRIPTION

Figure 1A:
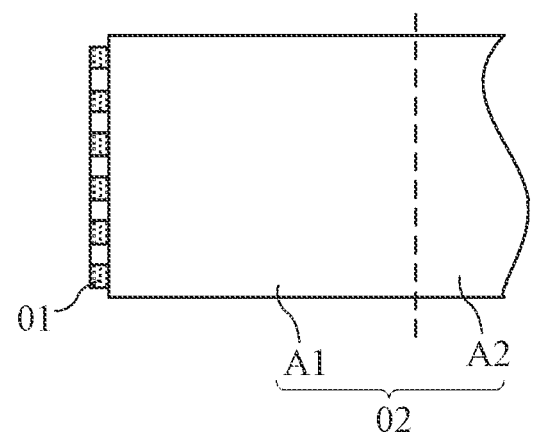
FIG. 1A is a top view showing a structure of a light strip and a light guide plate that are mounted in cooperation in the related art.

Technical solutions in some embodiments of the present disclosure will be described clearly and completely with reference to the accompanying drawings below. Obviously, the described embodiments are merely some but not all embodiments of the present disclosure. All other embodiments obtained by a person having ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the description and the claims are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values beyond those stated.

As used herein, the terms such as "substantially" or "approximately" include a stated value and an average value within an acceptable range of deviation of a particular value. The acceptable range of deviation is determined by a person of ordinary skill in the art, in consideration of measurement in question and errors associated with the measurement of a particular quantity (i.e., limitations of a measurement system).

Exemplary embodiments are described herein with reference to sectional views and/or plan views as idealized exemplary drawings. In the accompanying drawings, thickness of layers and regions are enlarged for clarity. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

A liquid crystal display (LCD) panel itself in a display device does not emit light, so a backlight source needs to be provided in order to make a content displayed by the LCD panel be seen. Design forms of the backlight mainly include two types: an edge-lit light source and a back-lit light source. The back-lit light source is usually disposed below the LCD panel, but since the back-lit light source needs to realize light mixing through multi-layer prisms, an overall thickness of the display device is large, and in turn, a thin and light design of the display device is difficult to realize. The edge-lit light source may be directly disposed on a side of the LCD panel, or may be cooperate with a light guide plate disposed below the LCD panel and be disposed on a side of the light guide plate. Therefore, the edge-lit light source may solve a problem of the large thickness of the display device caused by the back-lit light source. However, a distance of light-mixing of the edge-lit light source is short, and a hotspot problem is prone to occur. If the distance of light mixing of the edge-lit light source is increased, a bezel of the display device will be enlarged, so that a narrow bezel design of the display device is difficult to realize. Therefore, the distance of light mixing of the edge-lit light source and a light incident effect are mutually restricted, which becomes a design bottleneck of a narrow bezel requirement.

Figure 1B:
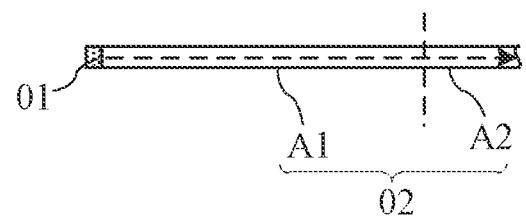
FIG. 1B is a front view showing the structure of the light strip and the light guide plate that are mounted in cooperation in the related art.

The hotspot is also known as firefly spot. For example, referring to FIGS. 1A and 1B, light-emitting diode (LED) lights 01 are arranged with a certain gap value to form a light strip, and the light strip is directly disposed on a side surface of the light guide plate 02. The LED light 01 is a point light source, and light intensity distribution of which is similar to Lambert body, that is, a light-emitting state is fan-shaped emission and has a certain light exit angle, therefore, the LED lights will form light-emitting regions with different brightness on a light incident side of the light guide plate. A phenomenon of alternating light and dark on the light incident side is called the hotspot or firefly spot. If the hotspot cannot end within a blocked light incident path (i.e., a non-effective light exit region A1 of the light guide plate 02), the hotspot will appear an effective light exit region A2 of the light guide plate 02 (corresponding to a display area of the LCD panel), and in turn, an image displayed by the LCD panel has alternate light and dark, this image defect is called a hotspot defect. Moreover, after light rays enter the light guide plate 02, a light ray from the center of each LED light with a strongest light intensity (the light as shown by the arrowed line in FIG. 1B) is difficult to be effectively utilized, and the light rays distributed as the Lambert body have a poor scattering effect inside the light guide plate, so that the hotspot phenomenon is further aggravated.

Figure 2A:
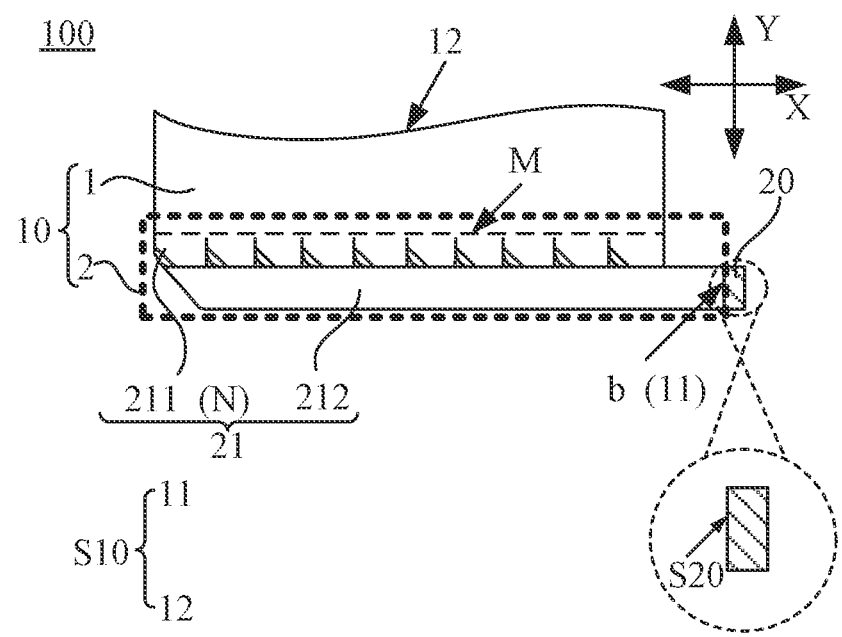
FIG. 2A is a diagram showing a structure of an edge-lit light source, in accordance with some embodiments of the present disclosure.
Figure 2B:
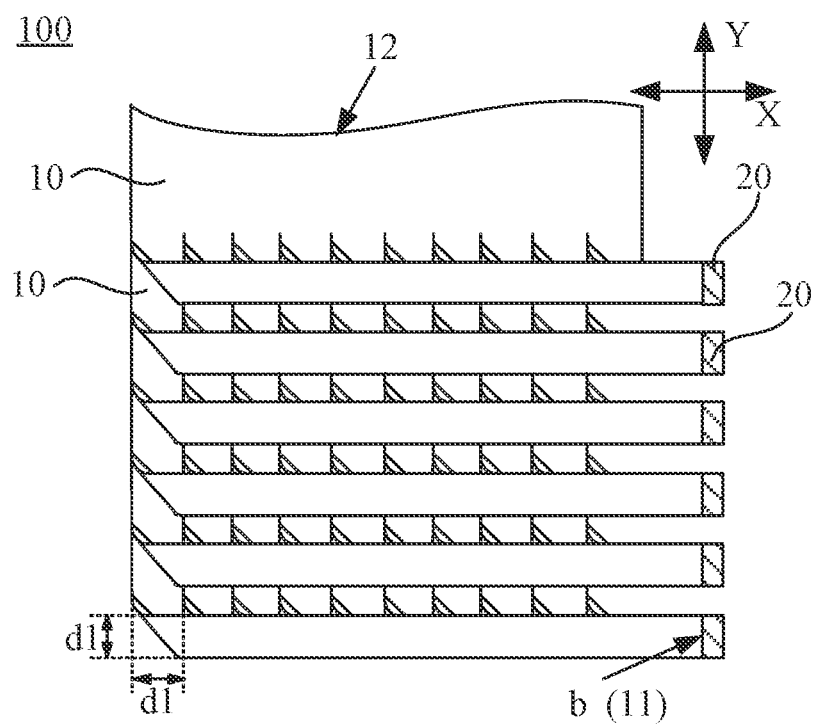
FIG. 2B is a diagram showing a structure of another edge-lit light source, in accordance with some embodiments of the present disclosure.

Based on this, some embodiments of the present disclosure provide an edge-lit light source 100. As shown in FIGS. 2A and 2B, the edge-lit light source 100 includes at least one light guide layer 10 and at least one light-emitting element 20. That is, the edge-lit light source 100 may include only a single light guide layer 10, or may include a plurality of light guide layers 10 arranged in a stack (e.g., two light guide layers 10, five light guide layers 10 or ten light guide layers 10). Furthermore, the edge-lit light source 100 may include only a single light-emitting element 20, or may include a plurality of light-emitting elements 20 (e.g., two light-emitting elements 20, five light-emitting elements 20, or ten light-emitting elements 20).

For at least one light guide layer 10, as shown in FIG. 2A, side surfaces S10 of the light guide layer 10 include a light incident surface 11 and a light exit surface 12, and the light guide layer 10 includes a bending region N located between the light incident surface 11 and the light exit surface 12. Furthermore, a light-emitting surface S20 of each light-emitting element 20 faces a light incident surface 11 of at least one light guide layer 10. With such a design, light rays emitted by the light-emitting element 20 may enter the light guide layer 10 from the light incident surface 11 of the light guide layer 10, and then exit from the light exit surface 12 of the light guide layer 10 after passing through the bending region N of the light guide layer 10.

The light-emitting element 20 may be a LED light.

By providing the bending region N between the light incident surface 11 and the light exit surface 12 in the light guide layer 10 in the edge-lit light source 100, in a case where the edge-lit light source 100 is applied to a display device, space occupied by the edge-lit light source 100 in a bezel region of the display device may be reduced, so that the display device may realize the narrow bezel design. In addition, while the display device realizes the narrow bezel design, since the edge-lit light source 100 includes the light guide layer 10 having the bending region N, a distance of light mixing of the edge-lit light source 100 may be increased, and a scattering effect of light rays in the light guide layer 10 may be enhanced, so that the light rays may be fully mixed in the light guide layer 10 and then exit, as a result, it is conducive to ameliorating the hotspot phenomenon.

In some examples, a bending degree of the bending region N is configured so as not to destroy a total reflection state of light rays therein. For example, a bending radius of the bending region N may be set to be not less than its own thickness. In this way, it may prevent the total reflection state of the light rays in the bending region N from being broken, so that leakage of the light rays in the bending region N may be prevented, and light guide efficiency of the light guide layer 10 is improved.

The bending region N may have various arrangements. The arrangements of the bending region N will be described below with reference to some embodiments.

In some embodiments, as shown in FIG. 2A, the light guide layer 10 includes a first light guide portion 1 and a second light guide portion 2.

An end surface of the first light guide portion 1 away from the second light guide portion 2 is the light exit surface 12.

It will be noted that the light exit surface 12 may be configured in various shapes, so that it may be adapted to light guide plates (or display panels) of various shapes. For example, in a case where the light exit surface 12 is a curved surface, it may be matched and aligned with a light guide plate (or display panel) whose side surface is a curved surface, so that light rays may enter the light guide plate (or display panel). In addition, it will be understood that the light exit surface 12 is not limited to be the curved surface. That is, the light exit surface may be a flat surface; alternatively, the light exit surface 12 may include both a flat surface and a curved surface; alternatively, the light exit surface 12 may be in other irregular shape. That is, it only needs to ensure that the light exit surface 12 match and align with a side surface of a corresponding light guide plate (or display panel), which will not be limited in the present disclosure.

With continued reference to FIG. 2A, the second light guide portion 2 includes at least two light guide bars 21, and each light guide bar 21 includes a bending portion 211 connected to the first light guide portion 1 and an extending portion 212 connected to the bending portion 211. A surface of each extending portion 212 opposite to an end of the extending portion 212 connected to a bending portion 211 is a light incident sub-surface b. A light-emitting surface S20 of each light-emitting element 20 faces at least one light incident sub-surface b, that is, a light-emitting surface S20 of a light-emitting element 20 may be arranged to face a single light incident sub-surface b (in this case, light rays emitted by each light-emitting element 20 may enter a single light guide bar 21 through a single light incident sub-surface b); alternatively, the light-emitting surface S20 of the light-emitting element 20 may be arranged to face two or more light incident sub-surfaces b (in this case, the light rays emitted by each light-emitting element 20 may enter two or more light guide bars 21 through two or more light incident sub-surfaces b).

The bending region N of each light guide layer 10 includes each bending portion 211 of the light guide layer 10. When the light rays emitted by the light-emitting element 20 enter each light guide bar 21, the light rays pass through the extending portion 212 and the bending portion 211 in sequence. And then, the light rays are directed from the bending portion 211 of the light guide bar 21 to the first light guide portion 1. Therefore, in some of the above-mentioned embodiments, the distance of light mixing of the light rays in the light guide layer 10 is increased, and by providing the bending portion 211 to connect the extending portion 212 and the first light guide portion 1, the light scattering effect may also be enhanced, so that the light is fully mixed in the light guide layer 10, as a result, the hotspot phenomenon is ameliorated. In addition, by providing the bending portion 211, a dimension of the light guide layer 10 in a second direction Y (as shown in FIGS. 2A and 2B) may be reduced. For example, the extending portion 212 originally extending in the second direction Y may be turned over to extend in a first direction X (as shown in FIGS. 2A and 2B) perpendicular to the second direction Y, so as to reduce a length of the edge-lit light source 100 in the second direction Y. In a case where the edge-lit light source is disposed in the display device, the display device may realize the narrow bezel design.

For example, a bending degree of each bending portion 211 is configured so as not to destroy a total reflection state of light rays therein. For example, the bending radius of each bending portion 211 may be set not less than its own thickness. In this way, the total reflection state of the light rays in each bending portion 211 may be prevented from being broken, so that leakage of the light rays in each bending portion 211 may be prevented, and light guide efficiency of each bending portion 211 is improved.

Figure 3A:
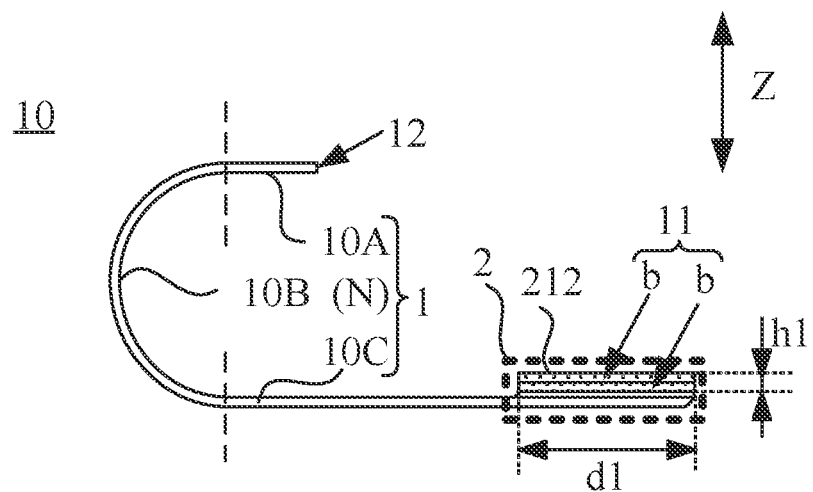
FIG. 3A is a diagram showing a structure of a single light guide layer, in accordance with some embodiments of the present disclosure.

In some embodiments, as shown in FIG. 3A, extending portions 212 of the light guide layer 10 are arranged in a stack (in a thickness direction Z of the first light guide portion 1 in the present embodiments). With such an arrangement, it is conducive to reducing a range of a space occupied by the second light guide portion 2, so that it is conducive to realizing a miniaturized design of the edge-lit light source 100, and further makes the display device adopting the edge-lit light source 100 easy to realize the narrow bezel design.

In some embodiments, as shown in FIGS. 2A and 2B, bending portions 211 of each light guide layer 10 are arranged in sequence in the first direction X; and the extending portions 212 extend in the first direction X. With such a design, the at least two light guide bars 21 of the second light guide portion 2 of the light guide layer 10 are arranged in alignment; and of the second light guide portion 2 of the light guide layer 10, the light incident sub-surfaces b of the extending portions 212 of the at least two light guide bars 21 are easily aligned with the light-emitting surface(s) of the light-emitting element(s) 20.

For example, referring to FIGS. 2A and 2B, at least one side of the light guide layer 10 in the first direction X is provided with light-emitting element(s) 20 corresponding to the light guide layer 10. In some examples, one side of the light guide layer 10 in the first direction X is provided with light-emitting element(s) 20 corresponding to the light guide layer 10, and the other side of the light guide layer 10 in the first direction X is provided with other light-emitting element(s) 20 corresponding to the light guide layer 10. Here, "light-emitting element(s) 20" may refer to a single light-emitting element 20, or may refer to two or more light-emitting elements 20; similarly, "other light-emitting element(s) 20" may refer to a single light-emitting element 20, or may refer to two or more light-emitting elements 20. In some other examples, one or more light-emitting elements 20 corresponding to a same light guide layer 10 are disposed on a same side of the light guide layer 10 in the first direction X. For example, FIGS. 2A and 2B show a case where the same light guide layer 10 is provided with a single light-emitting element 20 corresponding to the light guide layer 10 on the same side in the first direction X.

For example, referring to FIG. 2A, the first direction X is perpendicular to the thickness direction of the first light guide portion 1, and parallel to an interface M between the first light guide portion 1 and the second light guide portion 2.

With continued reference to FIGS. 2A and 2B, in a case where the light-emitting element(s) 20 (the number of the light-emitting element(s) 20 may be one, or two or more) corresponding to the same light guide layer 10 are located on the same side of the light guide layer 10 in the first direction X, for example, bending radiuses of the bending portions 211 of the light guide layer 10 sequentially increase in a direction from a side of the second light guide portion 2 proximate to the corresponding light-emitting element(s) 20 to a side of the second light guide portion 2 away from the corresponding light-emitting element(s) 20. With such an arrangement, of the light guide layer 10, extending portions 212 connected to respective bending portions 211 are easy to be stacked in the thickness direction of the first light guide portion 1. In other words, with such a design, in a case where the extending portions 212 of the light guide bars 21 are arranged in a stack, the light rays may be more easily to pass through the bending portions 211, and the light mixing effect may be improved.

Based on this, lengths of the extending portions 212 of each light guide layer 10 may sequentially increase in a direction from a side of the second light guide portion 2 proximate to the first light guide portion 1 to a side of the second light guide portion 2 away from the first light guide portion 1, so that the light incident sub-surfaces of the extending portions 212 of the light guide layer 10 are easily connected together as a whole, so as to form the light incident surface 11 of the light guide layer 10. For example, the light incident surface 11 includes a flat surface and/or a curved surface. For example, the light incident surface may only include the flat surface, or only the curved surface, or both the flat surface and the curved surface. Alternatively, the light incident surface may be in other irregular shape.

For example, the light incident sub-surface b of each extending portion 212 may be located on either side thereof in the first direction X. In some examples, light incident sub-surface(s) b of extending portion(s) 212 of each light guide layer 10 are located on one side thereof in the first direction X, and light incident sub-surface(s) b of other extending portions) 212 of the light guide layer 10 are located on the other side thereof in the first direction X. In this case, the light incident sub-surface(s) b of the extending portion(s) 212 may face a light-emitting surface of a same light-emitting element 20, and the light incident sub-surface(s) b of the other extending portion(s) 212 may also face a light-emitting surface of another light-emitting element 20. Here, "light incident sub-surface(s) b of extending portion(s) 212" may refer to a light incident sub-surface b of a single extending portion, or may refer to light incident sub-surfaces b of two or more extending portions 212; similarly, "light incident sub-surface(s) b of other extending portion(s) 212" may refer to a light incident sub-surface b of a single extending portion, or may refer to light incident sub-surfaces b of two or more extending portions 212. In some other examples, referring to FIGS. 2A and 2B, the light incident sub-surfaces b of the extending portions 212 in each light guide layer 10 are located on a same side thereof in the first direction X. In this case, as shown in FIGS. 2A and 2B, the light incident sub-surfaces b of the extending portions 212 in the light guide layer 10 may all face a light-emitting surface of a same light-emitting element 20.

Figure 3B:
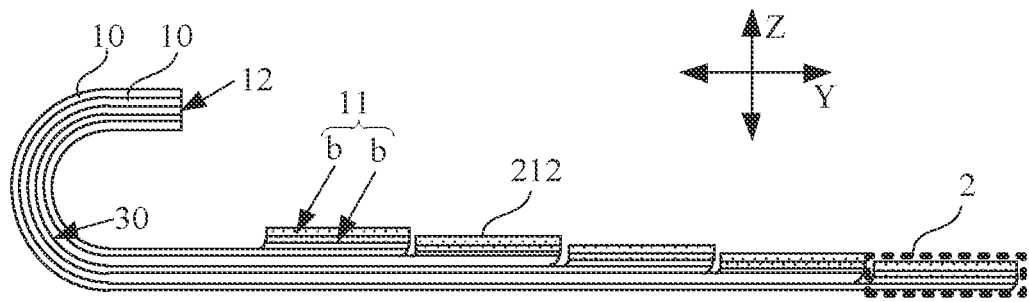
FIG. 3B is a diagram showing a structure of a plurality of light guide layers arranged in a stack, in accordance with some embodiments of the present disclosure.

In some embodiments, referring to FIGS. 3A and 3B, of a same light guide layer 10, extending portions 212 are provided on at least one side of a first light guide portion 1 in the thickness direction Z thereof. That is, of the same light guide layer 10, each extending portion 212 may be located on either side of the first light guide portion 1 in the thickness direction thereof. In some examples, of the same light guide layer 10, extending portion(s) 212 are located on one side of the first light guide portion 1 in the thickness direction Z thereof, and other extending portion(s) are located on the other side of the first light guide portion 1 in the thickness direction Z thereof. In this case, light incident sub-surface(s) b of the extending portion(s) 212 may face a light-emitting surface of a same light-emitting element 20, and light incident sub-surface(s) b of the other extending portion(s) 212 may also face a light-emitting surface of another light-emitting element 20; alternatively, the light incident sub-surfaces b of the extending portions 212 may all face a light-emitting surface of a same light-emitting element 20. Here, "extending portion(s) 212" may refer to a single extending portion 212, or may refer to two or more extending portions 212; similarly, "other extending portion(s) 212" may refer to a single extending portion 212, or may refer to two or more extending portions 212. In some other examples, referring to FIGS. 3A and 3B, extending portions 212 of each light guide layer 10 are located on a same side of the first light guide portion 1 in the thickness direction Z thereof. In this case, the light incident sub-surfaces b of the extending portions 212 may face a light-emitting surface of a single light-emitting element 20.

With continued reference to FIGS. 2A, 2B, 3A and 3B, in a case where the extending portions 212 of each light guide layer 10 are located on the same side of the first light guide portion 1 in the thickness direction Z thereof, for example, refer to FIGS. 2A and 2B, the light incident sub-surfaces b of the extending portions 212 constitute the light incident surface 11 of the light guide layer 10 (e.g., in this case, the light incident sub-surfaces b of the extending portions 212 of the light guide layer 10 are flush or arranged in a substantial curved surface), the light incident surface 11 is located on a side of two opposite sides of the light guide layer 10 in the first direction X, and the light incident surface 11 faces a light-emitting surface of a same light-emitting element 20. Here, the light incident surface 11 may only include a flat surface, or may only include a curved surface, or may include both a flat surface and a curved surface; alternatively, the light incident surface may be in other irregular shape. The present disclosure does not limit this, as long as the light incident surface 11 may be matched and aligned with the side surface of the light guide plate (or display panel).

It will be noted that the light incident surface of each light guide layer 10 includes light incident sub-surfaces b in the light guide layer 10. The light rays emitted by each light-emitting element 20 may only be directed to a single light incident sub-surface b of a light guide layer 10, or may be directed to two or more light incident sub-surfaces b of the light guide layer 10, or may be directed to all light incident sub-surfaces of the light guide layer 10. The present disclosure does not limit this. In addition, in a case where the edge-lit light source 100 includes only a single light guide layer 10, the light exit surface 12 of the light-guide layer 10 is a light exit surface of the edge-lit light source 100; and in a case where the edge-lit light source 100 includes two or more light guide layers 10, light exit surfaces 12 of the light guide layers 10 together form the light exit surface of the edge-lit light source 100 (e.g., in this case, the light exit surfaces 12 of the light guide layers 10 are flush or arranged in a substantial curved surface). It will be understood that the present disclosure does not limit a shape and a size of the light exit surface, as long as the light exit surface of the edge-lit light source 100 is matched and aligned with the side surface of the light guide plate (or display panel), and light rays may enter the light guide plate (or display panel). For example, the light exit surface of the edge-lit light source 100 may include only a flat surface, or may include only a curved surface, or may include both a flat surface and a curved surface; alternatively, the light exit surface may be in other irregular shape.

The number of the light guide layer(s) 10 in the edge-lit light source 100 may be determined by an alignment thickness. That is, in a case where a thickness of each light guide layer 10 is constant, the number of the light guide layer(s) in the edge-lit light source 100 may be determined according to a thickness of the light guide plate (or display panel), so that the thicknesses of the light guide layer(s) and the light guide plate are consistent or approximately consistent. In this way, light rays may almost completely enter the light guide plate (or display panel).

The number of the light-emitting element(s) 20 in the edge-lit light source 100 may be determined according to required brightness. That is, the number of the light-emitting element(s) 20 may be increased with an increase of the required brightness.

For example, a material of each light guide layer 10 includes a flexible material. For example, a flexible material with good light guide performance may be selected. In some examples, the material of the light guide layer 10 includes flexible materials such as polycarbonate (PC) and polyethylene terephthalate (PET). In addition, the thickness of the light guide layer 10 may be set to be not more than 100 μm. With such a design, the light guide layer 10 is easy to be bent and aligned, and the light guide layer 10 is not easily broken during bending.

Figure 4:
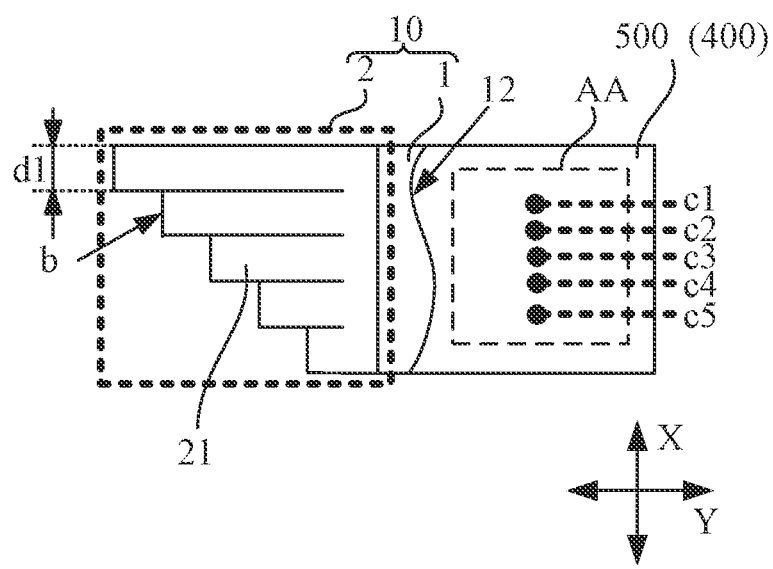
FIG. 4 is a diagram showing a structure of a light guide layer mounted in cooperation with a light guide plate (or display panel) in an unfolded state, in accordance with some embodiments of the present disclosure.

For each light guide layer 10, referring to FIG. 4, the second light guide portion 2 includes at least two light guide bars 21. The two light guide bars 21 may be formed by directly cutting a layered portion by a cutter. Then, each light guide bar is turned over to change the light guide bar from extending in the second direction Y to extending in the first direction X, so as to obtain the light guide layer 10 shown in FIG. 2A.

It is worth noting that, referring to FIG. 4, in a case where the edge-lit light source includes only a single light guide layer 10, the light exit surface 12 of the first light guide portion 1 of the light guide layer 10 is matched and aligned with a side surface of a light guide plate 500 (or display panel 400). And the second light guide portion 2 of the light guide layer 10 is divided into five light guide bars 21 with an equal width, and the five light guide bars 21 are bent in the above way to correspond to a same LED light (i.e. the light-emitting element). In this case, brightness of five points c1 to c5 are respectively extracted in the first direction X in a display area AA, and brightness uniformity of the five points is greater than 95%. Therefore, it may be proved that it is almost no effect on the brightness uniformity of the display area AA after the second light guide portion 2 of the light guide layer 10 is cut.

The number of divisions of the second light guide portion 2 of each light guide layer 10 (i.e., the number of light guide bars 21) may be determined by a height of the light-emitting surface of the light-emitting element 20. For example, in a case where a light-emitting surface of each light-emitting element 20 faces light incident sub-surfaces of a single light-guide layer 10, the number of divisions (i.e., the number of light guide bars 21) may increase as a height of the light-emitting surface of the light-emitting element 20 increases. It will be understood that a thickness of each light guide bar 10 is fixed, so that the more the number of the light guide bars 21 is, the thicker a whole thickness of the light guide bars 21 after being superposed is, and the whole thickness of the light guide bars 21 after being superposed corresponds to the height of the light-emitting surface of the light-emitting element 20. Therefore, the whole thickness of the light guide bars 21 after being superposed may be the same as or close to the height of the light-emitting surface of the light-emitting element 20 by reasonably setting the number of the light guide bars 21. Based on this, a width of each light guide bar 21 (i.e., a dimension of each light guide bar 21 in the first direction X before being turned over) may be set according to a width of the light-emitting surface of the light-emitting element 20, so that the light-emitting surface of the light-emitting element 20 may be more sufficiently attached to the light incident sub-surfaces b of the turned-over light guide bars 21 of each light guide layer 10.

Figure 5:
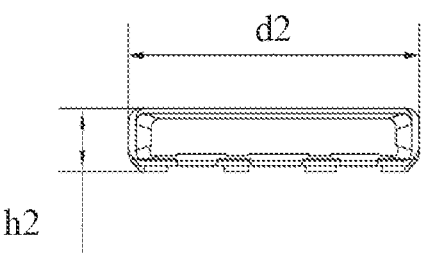
FIG. 5 is a diagram showing a structure of a light-emitting element, in accordance with some embodiments of the present disclosure.

For example, referring to FIG. 5, in an example, the height h2 of the light-emitting element 20 is 0.6 mm, and the width d2 of the light-emitting element 20 is 3.8 mm, the thickness of a single light guide layer may be 50 μm, and the material of which may include PC. In this case, the second light guide portion 2 of the light guide layer 10 is equally divided into ten parts, and a width d1 of each part (e.g., d1 shown in FIGS. 2B, 3A, and 4) is 3.8 mm, that is, d1 is equal to d2 (d1=d2). In this way, after the light guide bars 21 are bent and fitted to the light-emitting element 20, it is possible to ensure that the light-emitting element 20 does not leak light in a width direction. Furthermore, the ten light guide bars 21 are bent sequentially and then arranged in a stack, and a total thickness h1 (e.g., h1 shown in FIG. 3A) of which is equal to 50 μm×10=500 μm, i.e., 0.5 mm, and 0.5 mm is less than 0.6 mm (that is, h1 is less than h2), so that after the light guide layer 10 is aligned with the light-emitting element 20 (e.g., the alignment and installation are realized by a mechanical structure), it may ensure that light rays transmitted by the light-emitting element 20 all enter the inside of the light guide layer 10.

In addition, if a case where the single light guide layer 10 is matched with a single light-emitting element 20 cannot meet high-brightness display requirements, the single light guide layer 10 may be matched with more light-emitting elements 20; alternatively, a structure of a plurality of light guide layers 10 arranged in a stack shown in FIGS. 2B and 3B may be selected.

In the structure of the plurality of light guide layers 10 arranged in a stack, referring to FIGS. 2B and 3B, alignment with the respective light-emitting elements 20 may be achieved by setting the light guide layers 10 to have different lengths. In addition, the number of light-emitting elements 20 may be flexibly selected by setting the number of the light guide layers.

In a case where the edge-lit light source includes at least two light guide layers 10 arranged in a stack; for example, as shown in FIG. 3B, the edge-lit light source further includes a laminating adhesive 30 disposed between two adjacent light guide layers 10, and a refractive index of the laminating adhesive 30 is substantially the same as a refractive index of the light guide layers 10. Here, "substantially the same" may mean that the refractive indexes of the two are equal; alternatively, a difference between the refractive indexes of the two is less than one-eighth of a refractive index of a larger one of the two refractive indexes. In this example, two adjacent light guide layers 10 may be relatively fixed, which improves connection stability and reliability between the two adjacent light guide layers 10, and the arrangement of the laminating adhesive 30 does not easily affect the light rays in the two adjacent light guide layers 10, and the light rays may still achieve total reflection in the light guide layers 10 arranged in a stack. In addition, in some other examples, the laminating adhesive 30 may not be disposed between two adjacent light guide layers 10. In this case, it is easier for the light rays to achieve total reflection in the light guide layers 10 arranged in a stack.

In some embodiments, the laminating adhesive 30 is a reflective adhesive. In this case, the light rays in light guide layers 10 will not interfere with each other.

In addition, in a case where the extending portions 212 of the light guide layer 10 are arranged in a stack, any two adjacent extending portions 212 may be provided with a laminating adhesive 30 therebetween. In addition, the refractive index of the laminating adhesive 30 located between any two adjacent extending portions 212 may be set to be substantially the same as a refractive index of the extending portions 212; alternatively, the laminating adhesive 30 may be set to be a reflective adhesive. Beneficial effects of providing the laminating adhesive 30 between two adjacent extending portions 212 are the same as beneficial effects of providing the laminating adhesive 30 between two adjacent light guide layers 10, which will not be repeated herein.

In some embodiments, referring to FIGS. 2B and 3B, the number of the light guide layers 10 is at least two, and the second light guide portions 2 of the light guide layers 10 are disposed in the second direction Y in sequence. With such an arrangement, each light guide layer 10 is easy to be installed in alignment with corresponding light-emitting element(s) 20, and the entire edge-lit light source 100 has a neat structure while meeting the high-brightness requirements, which is conducive to realizing miniaturization, and is further convenient to be installed in the display device, and the narrow bezel design is realized while making the display device less prone to hotspot defects.

For example, the second direction Y is perpendicular to the thickness direction of the first light guide portion 1, and perpendicular to the interface M between the first light guide portion 1 and the second light guide portion 2.

Figure 3C:
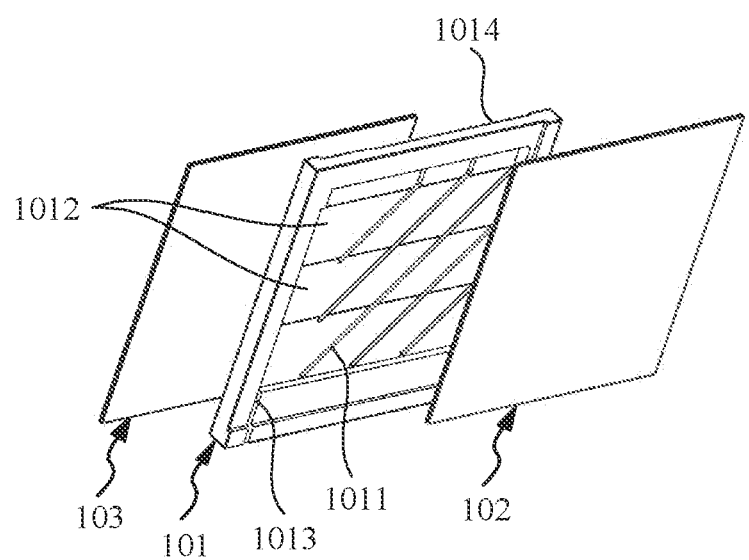
FIG. 3C is a diagram showing an exploded structure of a light-guide-layer shaping member, a first cover body and a second cover body, in accordance with some embodiments of the present disclosure.
Figure 3D:
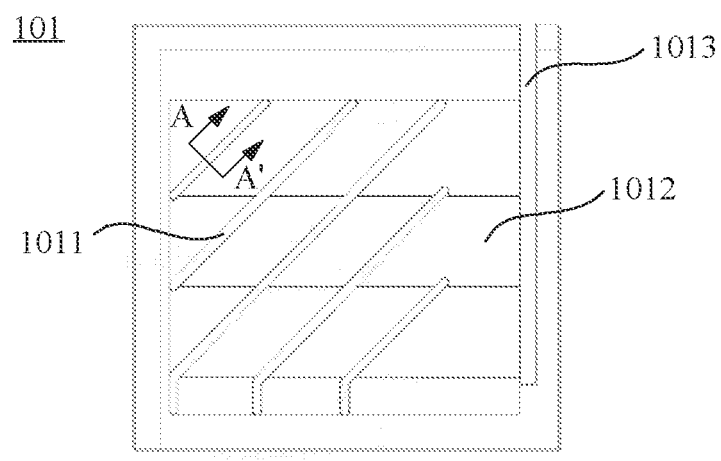
FIG. 3D is a diagram showing a structure of a light-guide-layer shaping member, in accordance with some embodiments of the present disclosure.
Figure 3E:
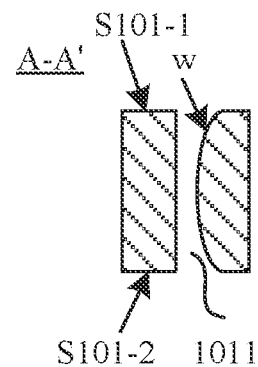
FIG. 3E is a cross-sectional view of the light-guide-layer shaping member taken along the direction A-A in FIG. 3D.
Figure 3F:
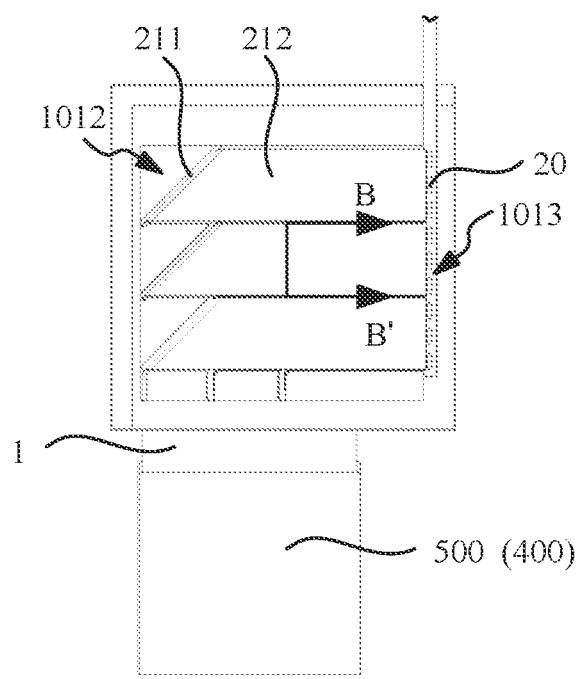
FIG. 3F is a diagram showing a structure of a light-guide-layer shaping member assembled with light-emitting elements, light guide layers, and a light guide plate (or display panel), in accordance with some embodiments of the present disclosure.

In some embodiments, as shown in FIGS. 3C to 3E, the edge-lit light source 100 further includes a light-guide-layer shaping member 101, and the light-guide-layer shaping member 101 has a first main surface S101-1 and a second main surface S101-2 that are opposite to each other, and a plurality of communication slots 1011 penetrating the first main surface S101-1 and the second main surface S101-2. As shown in FIG. 3F, each bending portion 211 of the light guide layer passes through a communication slot 1011, so that each extending portion 212 of the light guide layer is proximate to the first main surface, and the first light guide portion 1 of the light guide layer is proximate to the second main surface. With such an arrangement, the light-guide-layer shaping member 101 may be used to support the light guide layer to a certain extent, so that the overall structure of the light guide layer is stable.

For example, referring to FIGS. 3C and 3D, the plurality of communication slots 1011 are parallel to each other. With such a design, it is conducive to making the extending portions 212 extend in a same direction.

FIG. 3E shows a schematic cross-sectional view of the communication slot 1011 in FIG. 3D taken along the direction A-A'. For example, referring to FIGS. 3E and 3F, a side wall w of the communication slot 1011 is arc-shaped. The bending portion 211 passes through the communicating slot 1011 and attaches to the arc-shaped side wall w, so that a bending degree of the bending portion 211 does not destroy the total reflection state of light rays therein. For example, in a case where the bending portion 211 is attached to the side wall w, a bending radius of the bending portion 211 is not less than its own thickness. With such a design, the leakage of the light rays at the bending portion 211 may be prevented, and the light guide efficiency of the light guide layer 10 may be improved.

With continued reference to FIG. 3E, another side wall of the communication slot 1011 (i.e., a side wall opposite to the side wall w of the communication slot 1011) may be set to any shape. For example, the another side wall may be set as a plane as shown in FIG. 3E. Based on this, an end of the another side wall located at an opening of the communication slot 1011 may be set to be a curved surface, so that the extending portion 212 and the bending portion 211 are not easily scratched by the another side wall of the communication slot 1011 when pass through the communication slot 1011.

Figure 3G:
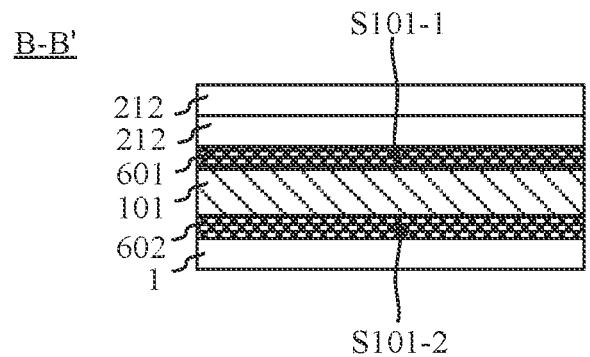
FIG. 3G is a cross-sectional view of FIG. 3D taken along the direction B-B'.

In some embodiments, referring to FIG. 3G, the edge-lit light source further includes a first reflective adhesive 601 and/or a second reflective adhesive 602.

The first reflective adhesive 601 is disposed between the first main surface S101-1 of a light-guide-layer shaping member 101 and an extending portion 212 of the light guide layer closest to the first main surface S101-1. With such an arrangement, the extending portion 212 may be attached to the first main surface S101-1 of the light-guide-layer shaping member 101 and the light rays may be reflected by the first reflective adhesive 601. That is, by providing the first reflective adhesive 601, the extending portion 212 is fixed, and the light rays in the extending portion 212 is not easily extracted into the light-guide-layer shaping member 101.

The second reflective adhesive 602 is disposed between the second main surface S101-2 of the light-guide-layer shaping member 101 and the first light guide portion 1 of the light guide layer. With such an arrangement, at least a portion of the first light guide portion 1 (i.e., a region of the first light guide portion 1 proximate to the second main surface) is attached to the second main surface S101-2 of the light-guide-layer shaping member 101, and the light rays may be reflected by the second reflective adhesive 602. That is, by providing the second reflective adhesive 602, the at least a portion of the first light guide portion 1 is fixed, and the light rays in the at least a portion of the first light guide portion 1 is not easily extracted into the light-guide-layer shaping member 101.

In some embodiments, as shown in FIGS. 3C and 3D, the light-guide-layer shaping member 101 includes first groove(s) 1012 and a second groove 1013 located in the first main surface, and the second groove 1013 is located on a side of the first groove(s) 1012. Referring to FIG. 3F, the extending portions 212 of the light guide layer is located in a first groove 1012, and the at least one light-emitting element 20 is located in the second groove 1013. With such a design, the extending portions 212 of the light guide layer may be accommodated by the first groove 1012, and the at least one light-emitting element 20 may be accommodated by the second groove 1013. Furthermore, the light-emitting surface of each light-emitting element 20 in the second groove 1013 may face a light incident sub-surface of a corresponding extending portion 212 in the first groove 1012.

Based on this, for example, referring to FIG. 3C, a bottom wall of the first groove 1012 is stepped. With such a design, the extending portion 212 of each light guide layer is easily contacted with the bottom wall of the first groove 1012 after the bending portion is bent.

For example, referring to FIG. 3C, the edge-lit light source further includes a first cover body 102 covering the first groove(s) 1012 and the second groove 1013. With such an arrangement, the extending portions 212 of the light guide layer may be limited in the first groove 1012, and the at least one light-emitting element 20 may be limited in the second groove 1013. That is, all extending portions 212 and the at least one light-emitting element 20 may be limited in a region between the light-guide-layer shaping member 101 and the first cover body 102.

The first cover body 102 and the light-guide-layer shaping member 101 may be detachably connected or fixedly connected, which is not limited in the present disclosure, as long as the two may be relatively fixed.

Figure 3H:
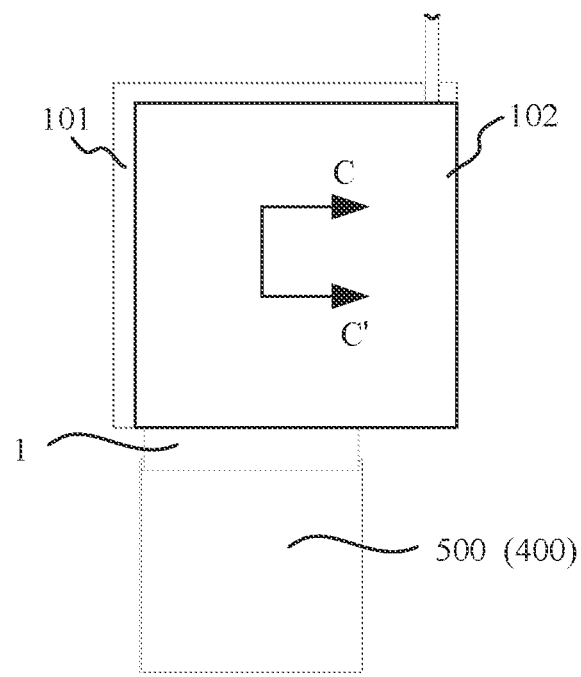
FIG. 3H is a diagram showing a structure of a light-guide-layer shaping member assembled with a first cover body, a second cover body, a light-emitting element, a light guide layer, a light guide plate (or display panel), in accordance with some embodiments of the present disclosure.
Figure 3I:
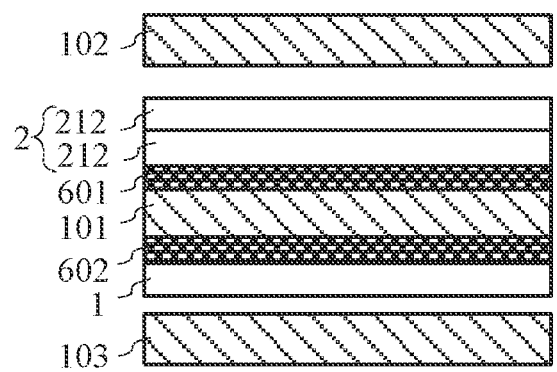
FIG. 3I is a cross-sectional view of FIG. 3H taken along the direction C-C'.

For example, referring to FIGS. 3H and 3I, the first cover body 102 and the second light guide portion 2 of the light guide layer have a gap therebetween. With such a design, the second light guide portion 2 is not in direct contact with the first cover body 102 (e.g., which may be insulated by air), so that light rays inside the second light guide portion 2 are not easily extracted into the first cover body 102.

In some embodiments, referring to FIGS. 3C and 3F, the light-guide-layer shaping member 101 further includes a third groove 1014 disposed in the second main surface, the at least a portion of the first light guide portion 1 (i.e., the region of the first light guide portion 1 proximate to the second main surface) is located in the third groove 1014. With such a design, the third groove 1014 may be used to accommodate the portion of the first light guide portion 1.

With continued reference to FIG. 3F, in some other embodiments, the first light guide portion 1 further includes the other portion located outside the third groove 1014, and an end of the other portion of the first light guide portion 1 (i.e., the light exit surface of the edge-lit light source) may be disposed opposite to the side surface of the light guide plate 500 (or display panel 400), so that the light rays may be directed to the light guide plate 500 (or display panel 400).

The other portion of the first light guide portion 1 may be set in a plane shape as shown in FIG. 3F, or may be set in a bent shape. For example, by bending the other portion of the first light guide portion 1, the light-guide-layer shaping member 101 may be located under the light guide plate 500 (or display panel 400), so that a space occupied by the edge-lit light source on a peripheral side of the light guide plate 500 (or display panel 400) may be reduced.

Based on this, for example, referring to FIG. 3C, the edge-lit light source further includes a second cover body 103 covering the third groove 1014. With such an arrangement, the portion of the first light guide portion 1 may be limited in the third groove 1014. That is, the portion of the first light guide portion 1 may be limited in a region between the light-guide-layer shaping member 101 and the second cover body 103.

The second cover body 103 and the light-guide-layer shaping member 101 may be detachably connected or fixedly connected, which is not limited in the present disclosure, as long as the two may be relatively fixed.

For example, referring to FIGS. 3H and 3I, the second cover body 103 and the first light guide portion 1 of the light guide layer have a gap therebetween. With such a design, the first light guide portion 1 is not in direct contact with the second cover body 103 (e.g., which may be insulated by air), so that light rays inside the first light guide portion 1 are not easily extracted into the second cover body 103.

It will be noted that in some other embodiments, the light-guide-layer shaping member 101 may include all the first groove(s) 1012, the second groove 1013 and the third groove 1014. Beneficial effects of providing the first groove(s) 1012, the second groove 1013 and the third groove 1014 will not be repeated herein.

Based on this, for example, the edge-lit light source may include both the first cover body 102 and second cover body 103. Beneficial effects of providing the first cover body 102 and the second cover body 103 will not be repeated herein. Here, it is worth noting that, in a case where the edge-lit light source includes both the first cover body 102 and the second cover body 103, the second groove 1013 for accommodating the at least one light-emitting element 20 may be provided as a through slot without a bottom wall, in this case, the first cover body 102 and the second cover body 103 may be used together to limit the at least one light-emitting element 20 in the second groove 1013.

The light-guide-layer shaping member 101, the first cover body 102 and the second cover body 103 may all be made of opaque materials, so that the light rays may be well limited between the light-guide-layer shaping member 101 and the first cover body 102 and between the light-guide-layer shaping member 101 and the second cover body 103, so as to prevent light leakage problem.

In some embodiments, as shown in FIG. 3A, the first light guide portion 1 includes a first portion 10A having the light exit surface 12, and a second portion 10B located between the first portion 10A and the second light guide portion 2 and having a bent shape.

The bending region N of the light guide layer 10 further includes the second portion 10B of the first light guide portion 1 of the light guide layer 10.

With such an arrangement, it is conducive to increasing the scattering effect of the light rays in the light guide layer 10, so that the light rays may be fully mixed in the light guide layer 10 and then exit, which is conducive to ameliorating the hotspot phenomenon.

For example, a bending degree of the second portion 10B is configured so as not to destroy a total reflection state of light rays therein. For example, a bending radius of the second portion 10B may be set not less than its own thickness, which may prevent the total reflection state of the light rays in the second portion 10B from being broken, so that leakage of the light rays in the second portion 10B may be prevented, and light guide efficiency of the second portion 10B is improved.

Based on the above-mentioned embodiments, for example, as shown in FIG. 3A, the first light guide portion 1 further includes a third portion 100 located between the second portion 10B and the second light guide portion 2. The third portion 100 and the first third portion 10A are substantially parallel to each other, and the third portion 100 and the first portion 10A are located on a same side of the second portion 10B proximate to the second light guide portion 2. Here, "substantially parallel" means that the third portion 100 and the first portion 10A may be parallel or may have a certain deviation. For example, a plane where the third portion 100 is located and a plane where the first portion 10A is located may have an included angle within 10 degrees therebetween.

With such a design, when the light exit surface 12 of each light guide layer 10 is matched and aligned with the side surface of the light guide plate (or display panel), the second light guide portion 2 of each light guide layer may extend to below the light guide plate (or display panel). In this way, it is conducive to reducing the space occupied by the edge-lit light source on the peripheral side of the light guide plate (or display panel), which is further conducive to realizing the narrow bezel design of the display device adopting the edge-lit light source.

It will be noted that each light guide layer in the edge-lit light source 100 may include only the first light guide portion 1, or may include only the second light guide portion 2, or may include both the first light guide portion 1 and the second light guide portion 2. The present disclosure is not limited thereto.

Figure 6:
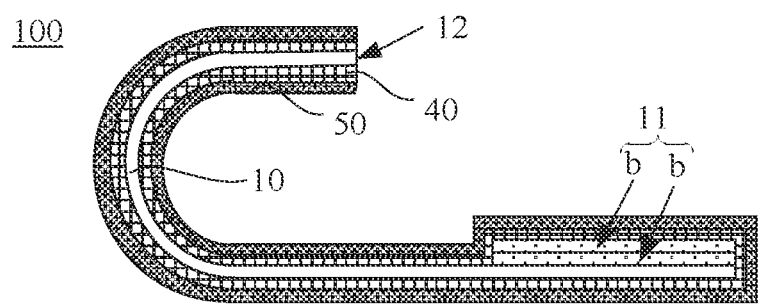
FIG. 6 is a diagram showing a structure of a light guide layer provided with a reflective coating and a light-absorbing coating, in accordance with some embodiments of the present disclosure.

In some embodiments, referring to FIG. 6, the edge-lit light source 100 further includes a reflective coating 40 disposed on an exposed surface of the at least one light guide layer 10. For example, the reflective coating 40 may be white adhesive. With such a design, the light rays in the light guide layer 10 may be reflected by the reflective coating 40, so that the light rays is totally reflected in the light guide layer 10. It will be noted that FIG. 6 only illustrates by considering an example where the edge-lit light source 100 includes a single light guide layer. It will be understood that in a case where the edge-lit light source 100 includes two or more light guide layers 10, the reflective coating may be provided on an exposed surface of the two or more light guide layers 10 as a whole after overlapping.

In addition, it is worth noting that, for the second portion 10B of the and the bending portions 211 of the second light guide portion 2, the light rays are relatively easily refracted from the bent second portion 10B of the first light guide portion 1 or the bending portions 211 of the second light guide portion 2 to the outside of the light guide layer 10 (e.g., in a case where the bending radius of the second portion 10B of the first light guide portion 1 is less than its own thickness, the light rays are easily refracted from the second portion 10B of the first light guide portion 1 to the outside of the light guide layer 10; in a case where the bending radius of each bending portion 211 is less than its own thickness, the light rays are easily refracted from the bending portion 211 to the outside of the light guide layer 10). In some of the above-mentioned embodiments, by providing the reflective coating 40 on the exposed surface of the at least one light guide layer 10, light leakage may be prevented (e.g., even in a case where the bending radius of the second portion 10B of the first light guide portion 1 is less than its own thickness, light leakage from the bent second portion 10B of the first light guide portion 1 to the outside of the light guide layer 10 may be prevented well by the reflective coating 40; and similarly, even in a case where the bending radius of each bending portion 211 is less than its own thickness, light leakage from the bending portion 211 to the outside of the light guide layer 10 may be prevented well by the reflective coating 40), so that it is conducive to ensuring an amount of light rays emitted from the light-emitting surface 12 of the light guide layer 10.

In some embodiments, referring to FIG. 6, the edge-lit light source 100 further includes a light-absorbing coating 50 disposed on a surface of the reflective coating 40 away from the at least one light guide layer 10. For example, the light-absorbing coating 50 may be black adhesive. With such a design, even in a case where the light rays passes through the reflective coating 40, it will be blocked and absorbed by the light-absorbing coating 50. Furthermore, it is possible to prevent the light rays from leaking and irradiating other components in the display device, so that the other components are less likely to be affected.

Figure 7A:
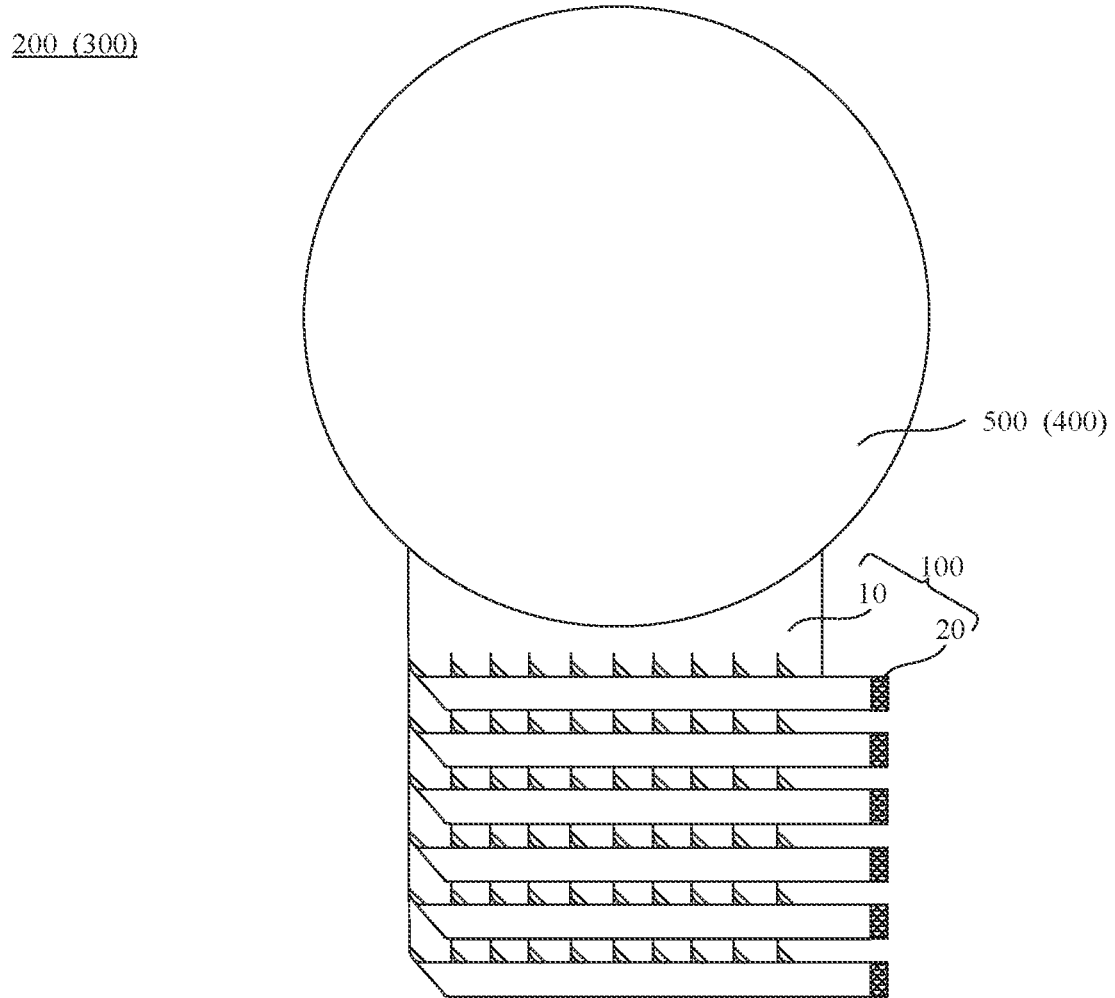
FIG. 7A is a diagram showing a structure of a backlight module (or display device), in accordance with some embodiments of the present disclosure.
Figure 7B:
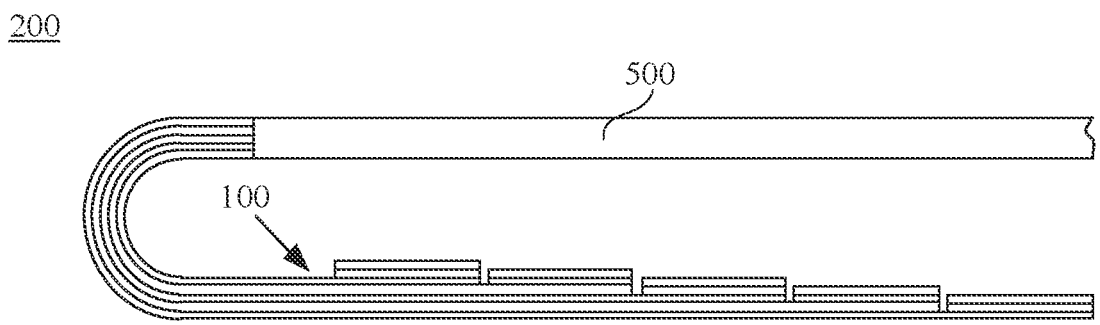
FIG. 7B is a diagram showing a structure of another backlight module, in accordance with some embodiments of the present disclosure.

Some embodiments of the present disclosure provide a backlight module 200. Referring to FIGS. 7A and 7B, the backlight module 200 includes the light guide plate 500 and the above-mentioned edge-lit light source 100. The light exit surface of the edge-lit light source 100 faces at least a portion of the side surface of the light guide plate 500 (e.g., the light exit surface may face a portion of the side surface of the light guide plate 500, or may face a whole side surface of the light guide plate 500).

The backlight module 200 includes the edge-lit light source 100 as described in any one of the above embodiments, so that the backlight module 200 has all beneficial effects of the edge-lit light source 100 as described above, which will not be repeated herein.

Figure 7C:
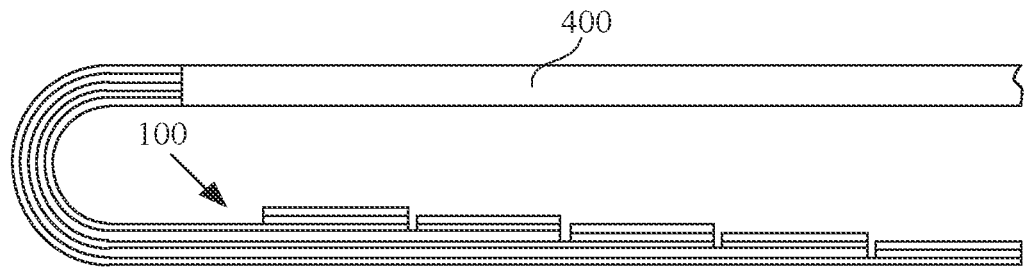
FIG. 7C is a diagram showing a structure of another display device, in accordance with some embodiments of the present disclosure.

Some embodiments of the present disclosure provide a display device 300. As shown in FIGS. 7A and 7C, the display device 300 includes a display panel 400 and the above-mentioned edge-lit light source 100, the light exit surface of the edge-lit light source 100 faces at least a portion of the side surface of the display panel 400 (e.g., the light exit surface may face a portion of the side surface of the display panel 400, or may face a whole side surface of the display panel 400). For example, the display panel 400 may be a transparent display panel. The transparent display panel may include an optical waveguide layer. In this case, a side surface of the optical waveguide layer may be used to receive light rays emitted from the edge-lit light source 100, and the light may be totally reflected in the optical waveguide layer.

Since the display device 300 includes the edge-lit light source 100 as described in any one of the above embodiments, so that the display device 300 has all beneficial effects of the edge-lit light source 100 as described above, which will not be repeated herein.

Figure 7D:
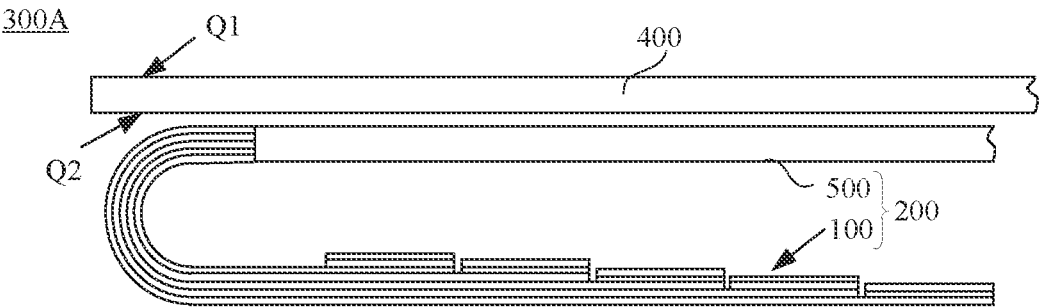
FIG. 7D is a diagram showing a structure of yet another display device, in accordance with some embodiments of the present disclosure.

Some embodiments of the present disclosure provide a display device 300A, as shown in FIG. 7D, the display device 300A includes the display panel 400 and the backlight module as described above. Two opposite sides of the display panel 400 are a display side Q1 and a non-display side Q2 respectively. The backlight module 200 is disposed on the non-display side of the display panel 400.

The display device 300A includes the edge-lit light source 100 as described in any one of the above embodiments, so that the display device 300A has all beneficial effects of the edge-lit light source 100 as described above, which will not be repeated herein.

Figure 7E:
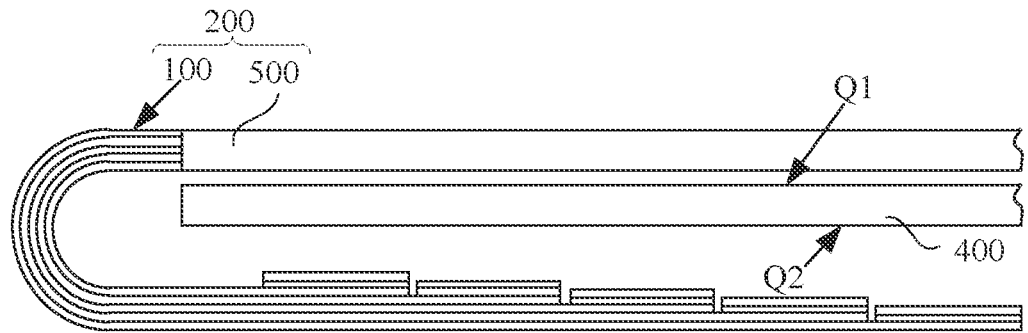
FIG. 7E is a diagram showing a structure of yet another display device, in accordance with some embodiments of the present disclosure.

Some embodiments of the present disclosure provide a display device 300B, as shown in FIG. 7E, the display device 300B includes the display panel 400 and the backlight module as described above. The two opposite sides of the display panel 400 are the display side Q1 and the non-display side Q2 respectively. The light guide plate 500 in the backlight module 200 is disposed on the display side Q1 of the display panel 400, and the edge-lit light source 100 of the backlight module 200 extends to the non-display side Q2 of the display panel 400.

In this case, the display panel 400 is a reflective display panel. For example, a reflective layer is disposed in a region of the display panel 400 proximate to the non-display side Q2, so that the light rays incident on the display panel 400 from the light guide plate 500 may be reflected to the display side Q1 of the display panel 400, so as to display an image.

The display device 300B includes the edge-lit light source 100 as described in any one of the above embodiments, so that the display device 300B has all beneficial effects of the edge-fit light source 100 as described above, which will not be repeated herein.

Figure 7F:
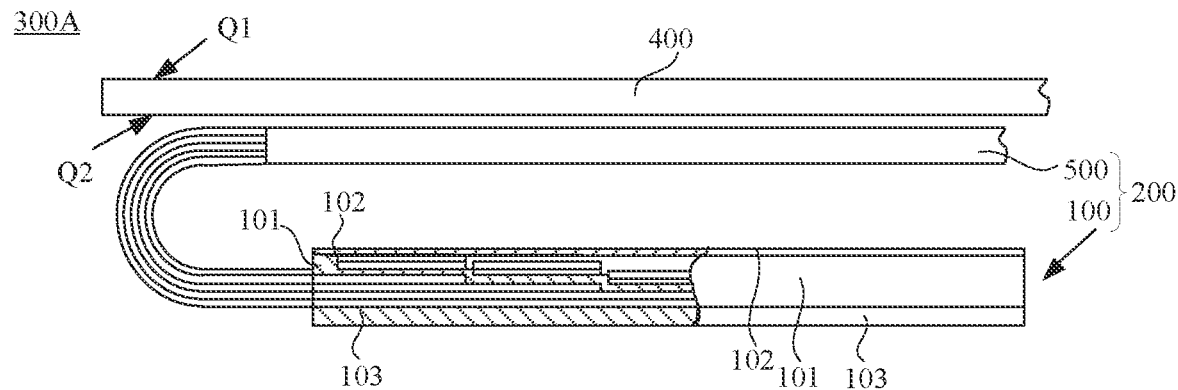
FIG. 7F is a diagram showing a structure of yet another display device, in accordance with some embodiments of the present disclosure.

In addition, it will be noted that the edge-lit light source 100 included in any one of the above-mentioned display devices shown in FIGS. 7A to 7E may be provided with the above-mentioned light-guide-layer shaping member 101, the first cover body 102 and the second cover body 103. For example, on the basis of the display device 300A shown in FIG. 7D, referring to FIG. 7F, the light-guide-layer shaping member 101, the first cover body 102 and the second cover body 103 are provided. In this way, the second light guide portion of each light guide layer in the edge-lit light source 100 may be fixed, so that the second light guide portion is not easily deformed, and in turn, stability of propagation of the light rays in each second light guide portion is improved. That is, a phenomenon of light leakage due to the deformation of the second light guide portion is less likely to occur.

The above description only takes the display device 300A as an example. It will be understood that the edge-lit light source 100 in any one of the backlight module 200, the display device 300 and the display device 300B may include the light-guide-layer shaping member 101, the first cover body 102 and the second cover body 103, and may achieve the same beneficial effects as the display device 300A, which will not be repeated herein.

Any one of the display device 300, the display device 300A and the display device 300B may be any component with a display function such as a television, a digital camera, a mobile phone, a watch, a tablet computer, a notebook computer or a navigator.

The above-mentioned display panel 400 may be a liquid crystal display panel. For example, the liquid crystal display panel may be any one of a twisted nematic (TN) display panel, an in-plane switching (IPS) display panel and a vertical alignment (VA) display panel.

Figure 8:
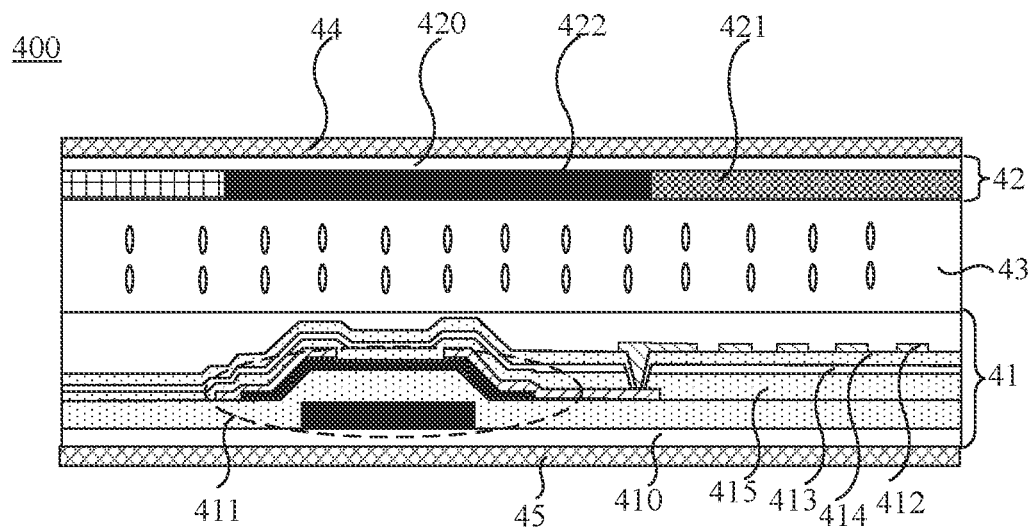
FIG. 8 is a diagram showing a structure of a display panel, in accordance with some embodiments of the present disclosure.

In some embodiments, as shown in FIG. 8, the display panel 400 includes an array substrate 41, an opposite substrate 42, and a liquid crystal layer 43 disposed between the array substrate 41 and the opposite substrate 42.

As shown in FIG. 8, each sub-pixel in the array substrate 41 has a thin film transistor 411 and a pixel electrode 412 that are located on a first substrate 410. The thin film transistor 411 includes an active layer, a source, a drain, a gate, and a portion of a gate insulating layer. The source and the drain are in contact with the active layer, and the pixel electrode 412 is electrically connected to the drain of the thin film transistor 411.

In some examples, as shown in FIG. 8, the array substrate 41 further includes a common electrode 413 disposed on the first substrate 410. The pixel electrode 412 and the common electrode 413 may be disposed in a same layer, and in this case, the pixel electrode 412 and the common electrode 413 are both a comb-tooth structure including a plurality of strip-shaped sub-electrodes. Alternatively, the pixel electrode 412 and the common electrode 413 may be disposed in different layers, and in this case, as shown in FIG. 8, a first insulating layer 414 is provided between the pixel electrode 412 and the common electrode 413. In a case where the common electrode 413 is disposed between the thin film transistor 411 and the pixel electrode 412, as shown in FIG. 8, a second insulating layer 415 is provided between the common electrode 413 and the thin film transistor 411. In some other embodiments, the opposite substrate 42 includes the common electrode 413.

As shown in FIG. 8, the opposite substrate 42 includes a color filter layer 421 disposed on a second substrate 420. In this case, the opposite substrate 42 may be referred to as a color filter (CF) substrate. The color filter layer 421 includes at least red photoresist units, green photoresist units and blue photoresist units, and the red photoresist units, the green photoresist units and the blue photoresist units are directly opposite to the sub-pixels in the array substrate 41 in a one-to-one correspondence. The opposite substrate 42 further includes a black matrix pattern 422 disposed on the second substrate 420. The black matrix pattern 422 is used for separating the red photoresist units, the green photoresist units, and the blue photoresist units.

For example, As shown in FIG. 8, the liquid crystal display panel 400 further includes a first polarizer 44 disposed on a side of the opposite substrate 42 away from the liquid crystal layer 43, and a second polarizer 45 disposed on a side of the array substrate 41 away from the liquid crystal layer 43.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. An edge-lit light source, comprising:
one or at least two light guide layers arranged in a stack;
of one or more light guide layers of the one or at least two light guide layers, side surfaces of each light guide layer including a light incident surface and a light exit surface, and the light guide layer including a bending region located between the light incident surface and the light exit surface; and
one or more light-emitting elements, a light-emitting surface of each light-emitting element facing a light incident surface of at least one light guide layer of the one or more light guide layers;
wherein the light guide layer includes:
a first light guide portion and a second light guide portion connected to each other, an end surface of the first light guide portion away from the second light guide portion being the light exit surface,
wherein the second light guide portion includes at least two light guide bars;
each light guide bar includes a bending portion connected to the first light guide portion and an extending portion connected to the bending portion, a surface of the extending portion opposite to an end of the extending portion connected to the bending portion is a light incident sub-surface; and
the light-emitting surface of each light-emitting element faces at least one light incident sub-surface; and
the bending region of the light guide layer includes all of the bending portions of the light guide layer.

2. A display device, comprising:
a display panel; and
the edge-lit light source according to claim 1, a light exit surface of the edge-lit light source being matched with at least a portion of a side surface of the display panel, and the light exit surface of the edge-lit light source facing the at least a portion of the side surface of the display panel,
wherein the light exit surface of the edge-lit light source includes the light exit surface of the light guide layer.

3. The edge-lit light source according to claim 1, wherein the bending portions of the light guide layer are arranged in sequence in a first direction, the first direction is perpendicular to a thickness direction of the first light guide portion; and
the extending portions of the light guide layer extend in the first direction, and the extending portions are arranged in a stack.

4. The edge-lit light source according to claim 3, wherein of the one or more light-emitting elements, at least one light-emitting element corresponding to the light guide layer is disposed on a side of the light guide layer in the first direction.

5. The edge-lit light source according to claim 3, wherein of the one or more light-emitting elements, at least one light-emitting element corresponding to a same light guide layer is located on a same side of the same light guide layer in the first direction; and
of the same light guide layer, bending radiuses of bending portions sequentially increase in a direction from a side of a second light guide portion proximate to the corresponding light-emitting element to a side of the second light guide portion away from the corresponding light-emitting element.

6. The edge-lit light source according to claim 3, wherein the extending portions of the light guide layer are located on at least one side of the first light guide portion in a thickness direction of the first light guide portion.

7. The edge-lit light source according to claim 3, wherein the extending portions of the light guide layer are located on a same side of the first light guide portion in a thickness direction of the first light guide portion, and the light incident sub-surfaces of the extending portions constitute the light incident surface of the light guide layer; and
the light incident surface is located on a side of two opposite sides of the first light guide portion in the first direction, and the light incident surface faces a light-emitting surface of a single light-emitting element of the one or more light-emitting elements.

8. The edge-lit light source according to claim 1, wherein the one or more light guide layers include at least two light guide layers, and second light guide portions of the at least two light guide layers are arranged in sequence in a second direction;
the second direction is perpendicular to a thickness direction of the first light guide portion.

9. The edge-lit light source according to claim 1, further comprising:
a light-guide-layer shaping member, the light-guide-layer shaping member having a first main surface and a second main surface opposite to each other, and a plurality of communication slots penetrating through the first main surface and the second main surface,
wherein each bending portion of the light guide layer passes through a single communication slot of the plurality of communication slots, the extending portions of the light guide layer are proximate to the first main surface, and the first light guide portion of the light guide layer is proximate to the second main surface.

10. The edge-lit light source according to claim 9, wherein a single side wall of the communication slot is arc-shaped; and the bending portion passes through the communication slot and attaches to the arc-shaped side wall, and is configured to have a bending degree capable of keeping a total reflection state of light rays inside the bending portion.

11. The edge-lit light source according to claim 9, further comprising:
a first reflective adhesive disposed between the first main surface and an extending portion of the light guide layer closest to the first main surface; and/or
a second reflective adhesive disposed between the second main surface and the first light guide portion.

12. The edge-lit light source according to claim 9, wherein the light-guide-layer shaping member includes:
at least one first groove and a second groove disposed in the first main surface, the second groove being located on a side of the at least one first groove;
the extending portions of the light guide layer being located in a first groove of the at least one first groove, and the one or more light-emitting elements being located in the second groove; and/or
a third groove disposed in the second main surface, and at least a portion of the first light guide portion being located in the third groove.

13. The edge-lit light source according to claim 12, further comprising:

a first cover body covering the at least one first groove and the second groove; and/or a second cover body covering the third groove.

14. The edge-lit light source according to claim 13, wherein
the first cover body and the second light guide portion of the light guide layer have a gap therebetween; and/or
the second cover body and the first light guide portion of the light guide layer have another gap therebetween.

15. The edge-lit light source according to claim 1, wherein the first light guide portion includes:
a first portion having the light exit surface; and
a second portion located between the first portion and the second light guide portion and in a bent shape,
wherein the bending region of the light guide layer further includes the second portion of the first light guide portion of the light guide layer.

16. The edge-lit light source according to claim 15, wherein the first light guide portion further includes:
a third portion located between the second portion and the second light guide portion, the third portion and the first portion are substantially parallel to each other, and the third portion and the first portion are located on a same side of the second portion proximate to the second light guide portion; and/or
the edge-lit light source further comprises:
a laminating adhesive disposed between two adjacent light guide layers of the one or more light guide layers,
wherein a refractive index of the laminating adhesive is substantially same as a refractive index of the two adjacent light guide layers; or the laminating adhesive is a reflective adhesive.

17. The edge-lit light source according to claim 1, further comprising:
a reflective coating disposed on an exposed surface of the bending region; or
the reflective coating disposed on the exposed surface of the bending region, and a light-absorbing coating disposed on a surface of the reflective coating away from the exposed surface.

18. A backlight module, comprising:
a light guide plate; and
the edge-lit light source according to claim 1, a light exit surface of the edge-lit light source being matched with at least a portion of a side surface of the light guide plate, and the light exit surface of the edge-lit light source facing the at least a portion of the side surface of the light guide plate,
wherein the light exit surface of the edge-lit light source includes the light exit surface of the light guide layer.

19. A display device, comprising:
a display panel, two opposite sides of the display panel being a display side and a non-display side respectively; and
the backlight module according to claim 18,
wherein the backlight module is disposed on the non-display side of the display panel; or
the light guide plate in the backlight module is disposed on the display side of the display panel, and the edge-lit light source in the backlight module extends to the non-display side of the display panel.

* * * * *